July 7, 1925.

R. S. BURDETTE

VULCANIZING DEVICE

Filed Jan. 6, 1922

1,545,033

Inventor
Richard S. Burdette

Philip E. Barnes

By R. O. Trogner
Attorney

Patented July 7, 1925.

1,545,033

UNITED STATES PATENT OFFICE.

RICHARD S. BURDETTE, OF AKRON, OHIO, ASSIGNOR TO THE GOODYEAR TIRE & RUBBER COMPANY, OF AKRON, OHIO, A CORPORATION OF OHIO.

VULCANIZING DEVICE.

Application filed January 6, 1922. Serial No. 527,350.

*To all whom it may concern:*

Be it known that I, RICHARD S. BURDETTE, a citizen of the United States, residing at Akron, in the county of Summit and State of Ohio, have invented new and useful Improvements in Vulcanizing Devices, of which the following is a specification.

This invention relates to vulcanizing devices for use in repairing articles that embody rubber, or rubber composition, for instance, such as tires, hose, or other articles possessing similar structural characteristics.

In order to exemplify its use and construction, I have elected to illustrate and describe its applicability in the art of repairing punctures in tire casings for which operation it is specifically adapted.

It is common practice, in repairing punctures in tire casings, to vulcanize a plug, or insert, that is formed of rubber composition in the orifice constituting the puncture. It is, however, extremely difficult, if not impossible under present practices, to distribute the heat throughout the plug or insert in such manner that the walls of the orifice, which, of course are already vulcanized, are not overcured during vulcanization of the plug, as will be readily understood without further explanation.

The present invention has been designed with the foregoing problem in view and, therefore, contemplates as a primary consideration, the provision of a device adapted to insure proper vulcanization of a plug or insert without injuriously affecting the surrounding of the wall of the orifice by overvulcanization.

It is also an object of the invention to so apply the heat that it will be diffused uniformly throughout that area of the plug adjacent the wall of the orifice and to secure a consistent expansion, particularly of this area against the walls of the orifice, to thereby attain a proper adhesion between the plug and the wall during vulcanization.

Other objects, such as ease of operation, and simplicity of construction, will appear when the following description is read in conjunction with the accompanying drawings in which.

Figure 1:
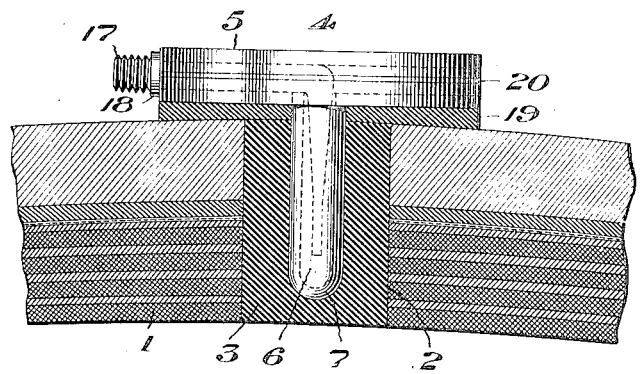
Fig. 1 is a fragmentary sectional view of a portion of a tire casing illustrating the invention in side elevation and its application in repairing a puncture.

Referring to the drawings by characters of reference, the numeral 1 designates a portion of a tire casing, of ordinary construction, which has been cored, as at 2, to receive a conventional form of plug 3, and 4 designates, as a whole, my improved device for vulcanizing the plug in the casing.

The device 4 comprises, generally speaking, a head portion 5 and a shank or hollow nipple portion 6, and is designed to be positioned relative to the plug 3 in substantially the manner illustrated in the drawings, that is to say, with the shank or nipple portion 6 inserted in the plug 3 in a position axially thereof. To permit of its being so positioned, the end of the shank or nipple 6 is tapered or rounded as at 7. In actual practice, the nipple may be positioned in the plug 3 either before or after the plug has been inserted in the puncture orifice. The device 5 may be formed in any suitable manner but preferably it comprises a disk like flange 8 carrying the aforesaid shank or nipple 6, which is capped by a similarly shaped plate 9 removably fastened thereto through the medium of screws 10'. The flange 8 and the plate 9 are respectively provided with diametrical channels 10 and 11 which are designed to register when the device is assembled to form a bore 12 that is in communication with a similar bore 13 in the hollow shank or nipple 6.

Figure 2:
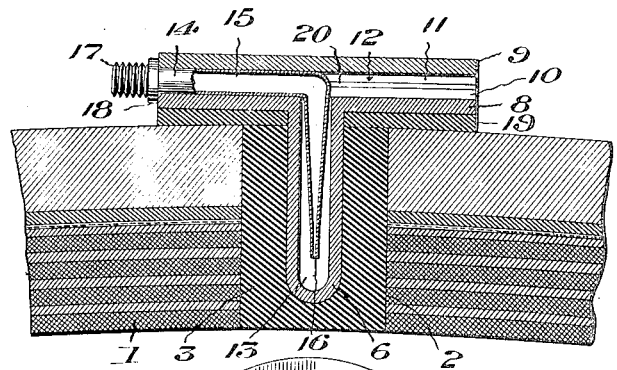
Fig. 2 is a similar view showing the invention in transverse sections.
Figure 3:
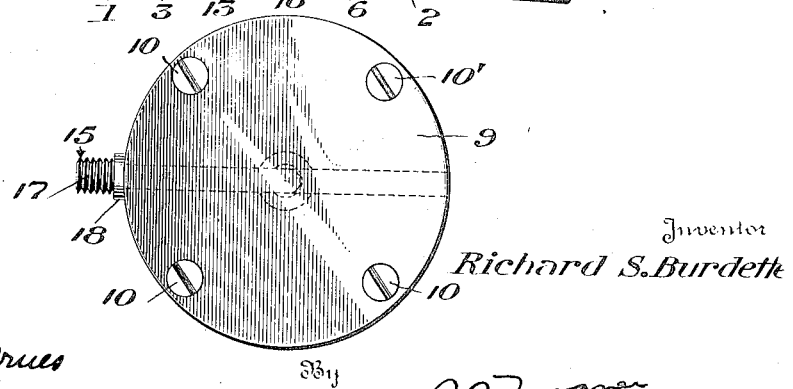
Fig. 3 is a top plan view of the invention.

The bore 13 in the aforesaid nipple 6 is provided for the purpose of introducing a vulcanizing medium into the nipple, such as steam or hot water, or any other suitable medium. I prefer, in this instance, to utilize steam and to introduce it within the nipple or shank in the form of a jet. To this end I provide an angulated nozzle 14 of substantially the injector type, which is designed to be partly contained within the channels 13 and partly within the bore 12. The nozzle 14 may also be constructed in any suitable manner but, in this instance, comprises an inlet portion 15, and an outlet portion 16, the latter portion being tapered, as will be seen by reference to Fig. 2. Any suitable means for connecting the nozzle to a source of steam supply may be provided, such, for instance, as the threaded nipple 17. Preferably, a collar 18 is also provided adjacent the nipple 17 in order that the portion 16 of the nozzle may be accurately centered in the bore 13 of the nipple or shank 6. As best shown in Fig. 2, that portion of the nozzle 14, that is contained in the bore 13, is smaller at its largest portion than the bore in order that the steam may exhaust into the free portion of the bore provided by the channels 10 and 11 and from there into the atmosphere. Preferably, although not necessarily, I interpose a washer 19 between the head member 5 and the casing in order to insulate them one from the other. Also, I prefer to utilize a washer 20 between the members 8 and 9 of the head member 4.

The operation of the device, it is believed, will be obvious from the foregoing and it will also be apparent that by admitting the continuous stream of the heating fluid into the aforesaid nipple, that an ideal medium is provided in the practice of this invention for uniformly distributing the heat necessary to vulcanization throughout the plug. After the vulcanization operation has been completed, the device may be readily withdrawn from the plug and the opening left by the nipple 6 may be filled in any suitable manner such, for instance, as by tire putty, cement, or the like.

While I have described my invention in detail and, therefore, utilized certain specific language, it is to be understood that the present disclosure is merely illustrative and is not designed in any way to limit the scope or spirit of the invention unless such limitations are indicated in the claims appended hereto.

The method of closing an opening in a rubber product is claimed in a copending application Serial No. 2293 filed Jan. 14, 1925.

What I claim is:

1. A device adapted for heating vulcanizable material with a heating fluid comprising a body portion for receiving fluid under pressure, a second portion adapted to be embedded in the material, said portions being respectively chambered, and an injector nozzle arranged to establish communication between the respective chambers.

2. A device adapted for treating vulcanizable material comprising a chambered body portion for receiving fluid under pressure, a chambered nipple arranged in angular relation to the body portion and adapted to be embedded in the material, and an angulated injector nozzle having a portion arranged within the chamber of said nipple.

3. A device for treating vulcanizing material comprising a body portion adapted to receive fluid under pressure, said portion having an inlet opening and an exhaust opening, a second portion arranged at an angle to said first portion provided with a chamber communicating with the exhaust opening, and an injector nozzle arranged to establish communication between the inlet opening and the chamber.

4. A device for treating vulcanizable material comprising a disc-shaped member provided with a diametrical slot in one face thereof, an axially disposed chambered nipple projecting from the opposite face of the disc adapted to be embedded in the material, an angulated injector nozzle having a tapered portion disposed in the chamber of the nipple, and a cap member adapted to be removably secured over the slotted face of the disc to retain the nozzle in place.

5. A device for treating vulcanizable material comprising a disc-shaped member provided with a diametrical slot in one face thereof, an axially disposed chambered nipple projecting from the opposite face of the disc, a cap disc also having a diametrical groove in one face thereof adapted to be removably secured over the slotted face of the member with its slot in alignment with the slot in said member, and an angulated injector nozzle comprising a straight portion adapted to be clamped between the member and the cap in the slots thereof, said nozzle including a tapered portion projecting in the chamber of the nipple.

In witness whereof I have hereunto signed my name in the presence of two subscribing witnesses.

RICHARD S. BURDETTE.

Witnesses:
W. J. McDanel,
L. M. Hartman.